(12) United States Patent
Tello

(10) Patent No.: US 12,509,904 B2
(45) Date of Patent: Dec. 30, 2025

(54) CANOPY FOR ATTACHMENT TO HELICOPTER ROTOR BLADES

(71) Applicant: Alvaro Tello, Fresno, CA (US)

(72) Inventor: Alvaro Tello, Fresno, CA (US)

( * ) Notice: Subject to any disclaimer, the term of this patent is extended or adjusted under 35 U.S.C. 154(b) by 202 days.

(21) Appl. No.: 18/598,645

(22) Filed: Mar. 7, 2024

(65) Prior Publication Data

US 2025/0283345 A1  Sep. 11, 2025

(51) Int. Cl.
| | |
|---|---|
| *E04H 15/06* | (2006.01) |
| *B64F 1/00* | (2024.01) |
| *E04H 15/54* | (2006.01) |
| *E04H 15/64* | (2006.01) |
| *B64C 27/04* | (2006.01) |

(52) U.S. Cl.
CPC .............. *E04H 15/06* (2013.01); *B64F 1/005* (2013.01); *E04H 15/54* (2013.01); *E04H 15/64* (2013.01); *B64C 27/04* (2013.01)

(58) Field of Classification Search
CPC ......... E04H 15/06; E04H 15/54; E04H 15/64; B64C 27/04; B64F 1/005
USPC .................................................. 135/88.1, 119
See application file for complete search history.

(56) References Cited

U.S. PATENT DOCUMENTS

| | | | | |
|---|---|---|---|---|
| 2,609,164 A | * | 9/1952 | Dillon ................... | B64D 29/08 |
| | | | | 244/121 |
| 4,613,096 A | | 9/1986 | Pugh | |
| 5,179,968 A | * | 1/1993 | Deichmann ............ | B64F 1/005 |
| | | | | 244/17.11 |
| 6,854,475 B2 | * | 2/2005 | Slabbert ................. | B64F 1/005 |
| | | | | 135/96 |
| 7,089,951 B2 | | 8/2006 | Bogart | |
| 7,131,610 B2 | * | 11/2006 | Swadling ............... | B64F 1/222 |
| | | | | 244/17.11 |
| D842,217 S | | 3/2019 | Nielsen | |
| 2003/0000562 A1 | * | 1/2003 | Slabbert ................. | B64F 1/005 |
| | | | | 135/96 |
| 2005/0061917 A1 | * | 3/2005 | Ross ...................... | B64F 1/222 |
| | | | | 244/121 |
| 2010/0229904 A1 | * | 9/2010 | Bower .................... | B64F 1/005 |
| | | | | 135/88.01 |

FOREIGN PATENT DOCUMENTS

| | | | | | |
|---|---|---|---|---|---|
| WO | WO-0152623 A2 | * | 7/2001 | ............. | B64F 1/005 |
| WO | WO2017079650 | | 5/2017 | | |
| WO | WO-2017079650 A1 | * | 5/2017 | ............. | E04H 15/06 |

* cited by examiner

*Primary Examiner* — Robert Canfield

(57) ABSTRACT

A canopy apparatus for protecting individuals from weather elements near a helicopter includes a pair of rotor blade pockets which mount to adjacent rotor blades of the helicopter at their free ends. A flexible sheet extends between the rotor blade pockets and toward a rotor head of the helicopter. A rotor head pocket is attached to the flexible sheet and is shaped to receive the rotor head of the helicopter. Additional straps are used to further secure the flexible sheet to the rotor blades. The canopy apparatus mounts to the helicopter such that the rotor blades may be rotated to adjust a position of the canopy apparatus with respect to a body of the helicopter.

12 Claims, 5 Drawing Sheets

CANOPY FOR ATTACHMENT TO HELICOPTER ROTOR BLADES

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to canopies and more particularly pertains to a new canopy for protecting individuals from weather elements near a helicopter.

(2) Description of Related Art Including Information Disclosed Under 37 CFR 1.97 and 1.98

The prior art discloses canopies which mount to helicopter rotor blades in order to provide shade or protection from precipitation to mechanics or other individuals near a helicopter. Some canopies known to the prior art include pockets which mount to the free ends of rotor blades of the helicopter. However, the prior art fails to describe such a canopy which uses a rotor head pocket to receive a rotor head of the helicopter and facilitate repositioning of the canopy by rotating the rotor blades with respect to a body of the helicopter.

BRIEF SUMMARY OF THE INVENTION

An embodiment of the disclosure meets the needs presented above by generally comprising a pair of rotor blade pockets, each of which is shaped to receive therein a free end of a corresponding rotor blade of a helicopter therein. A flexible sheet is coupled to and extends between the pair of rotor blade pockets. The flexible sheet has a top side and a bottom side. Each rotor blade pocket is positioned on a corresponding mounting edge of a pair of mounting edges of the flexible sheet. Each mounting edge of the flexible sheet extends from the corresponding rotor blade pocket toward a vertex. A rotor head pocket is coupled to the flexible sheet at the vertex. The rotor head pocket has an opening extending therein which faces downwardly with respect to the flexible sheet during normal use. The rotor head pocket is shaped to receive a rotor head of the helicopter therein.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
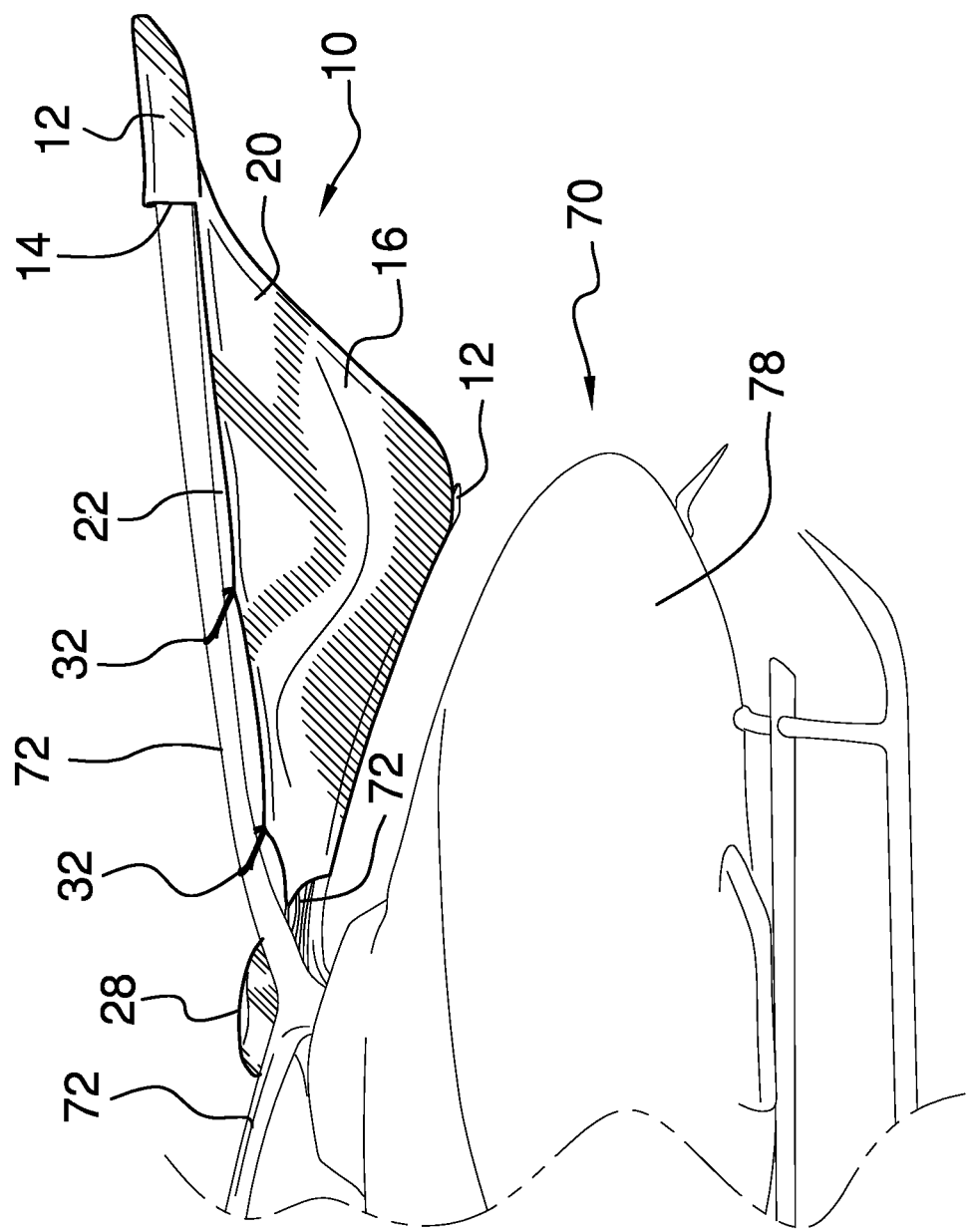
FIG. 1 is a perspective in-use view of a canopy apparatus according to an embodiment of the disclosure.
Figure 2:
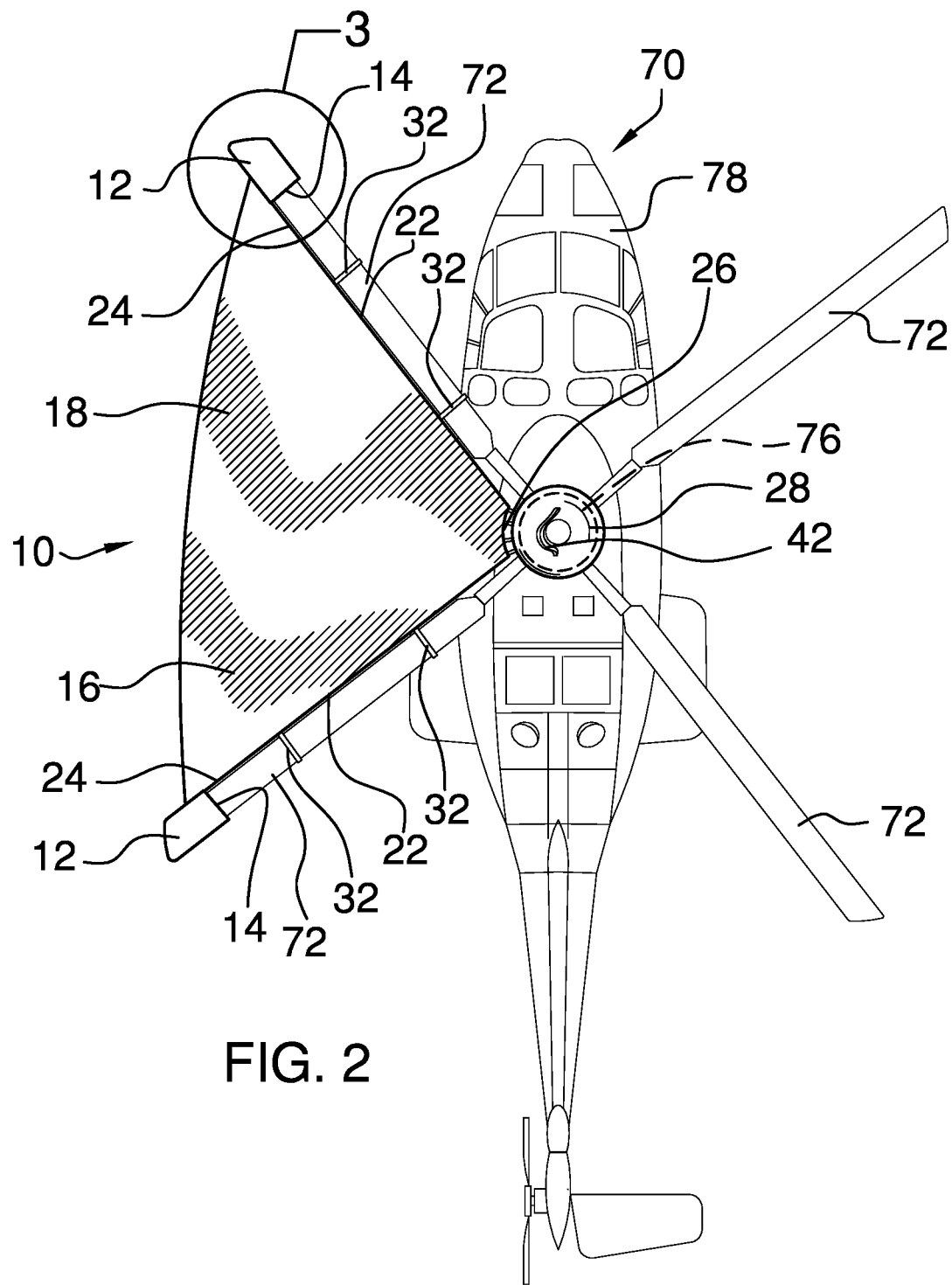
FIG. 2 is a top in-use view of an embodiment of the disclosure.
Figure 3:
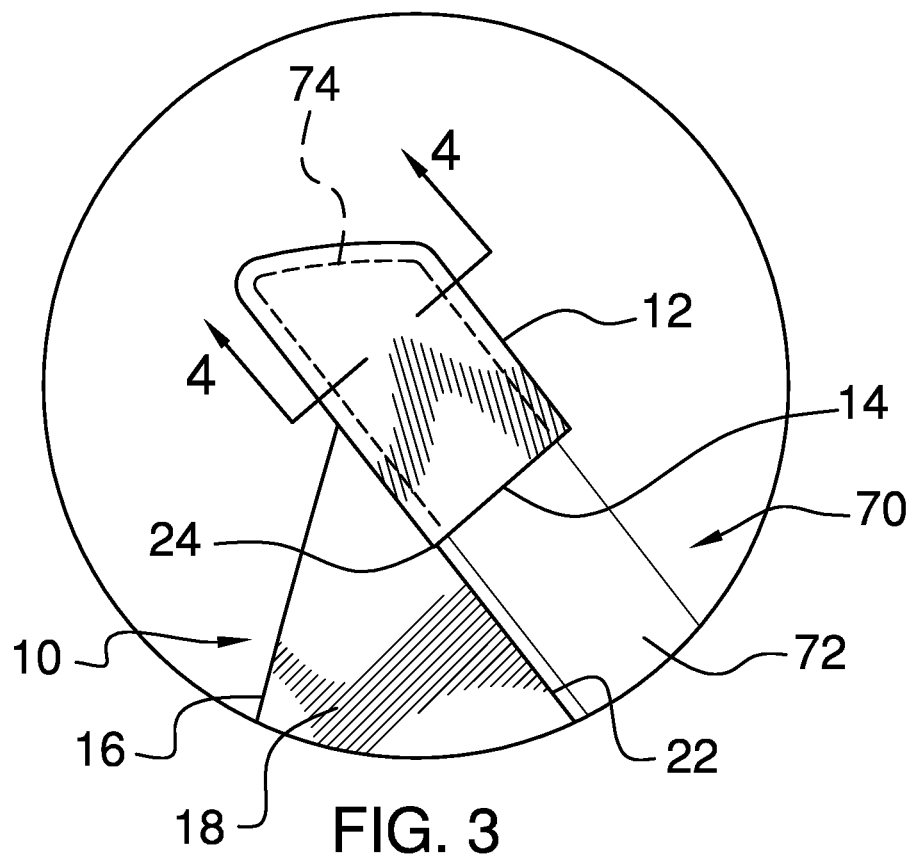
FIG. 3 is a detail view of an embodiment of the disclosure taken from Window 3 in FIG. 2.
Figure 4:
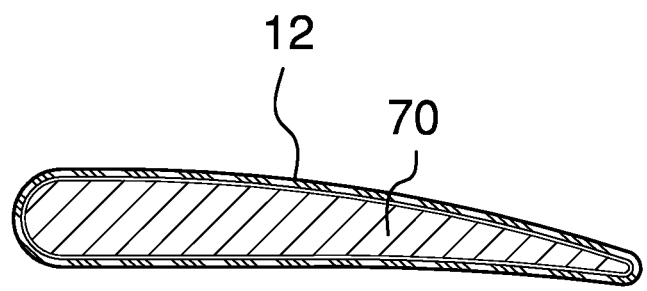
FIG. 4 is a cross-section view of an embodiment of the disclosure taken from Line 4-4 in FIG. 3.
Figure 5:
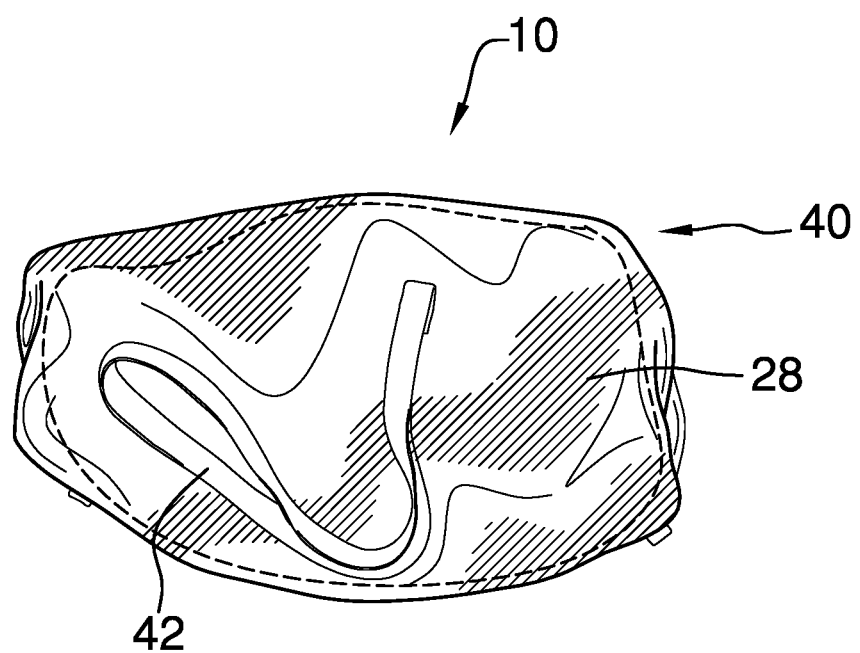
FIG. 5 is a top view of an embodiment of the disclosure in a stored configuration.
Figure 6:
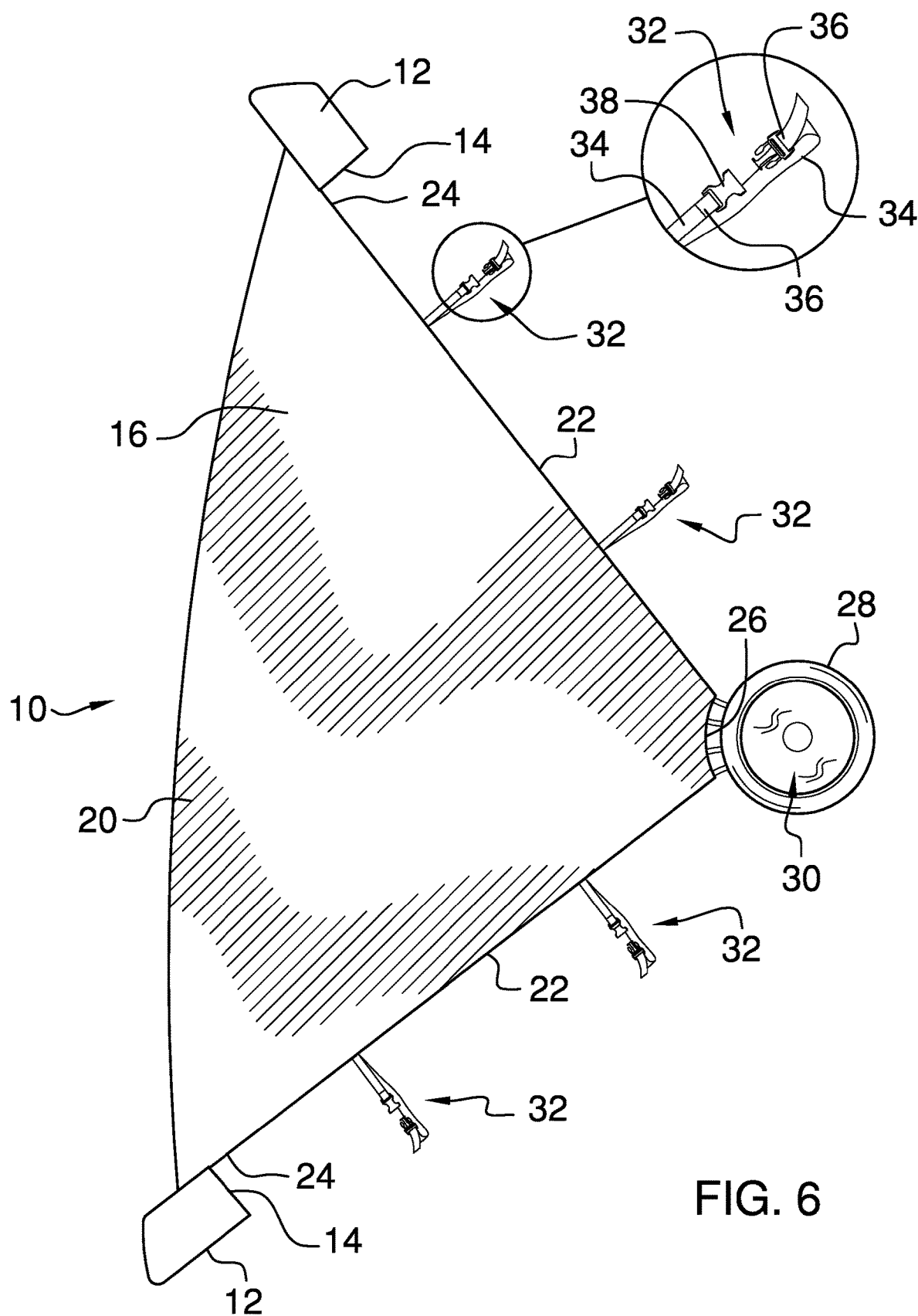
FIG. 6 is a bottom view of an embodiment of the disclosure.

With reference now to the drawings, and in particular to FIGS. 1 through 6 thereof, a new canopy embodying the principles and concepts of an embodiment of the disclosure and generally designated by the reference numeral 10 will be described.

As best illustrated in FIGS. 1 through 6, the canopy apparatus 10 generally comprises a pair of rotor blade pockets 12, each of which is shaped to receive a free end 74 of a rotor blade 72 of a helicopter 70 therein. A flexible sheet 16 is coupled to and extends between the pair of rotor blade pockets 12. The flexible sheet 16 has a triangular shape and has a top side 18 and a bottom side 20. The flexible sheet 16 has a pair of mounting edges 22 which converge toward a vertex 26. Each rotor blade pocket 12 is positioned at a distal end 24 of a respective one of the mounting edges 22 relative to the vertex 26. Each rotor blade pocket 12 has an open end 14 which faces generally toward the vertex 26 during normal use.

A rotor head pocket 28 is coupled to the flexible sheet 16 at the vertex 26. The rotor head pocket 28 has an opening 30 which extends therein and which faces downwardly with respect to the flexible sheet 16 during normal use. The rotor head pocket 28 is shaped and configured to receive a rotor head 76 of the helicopter 70 therein. The rotor head pocket 28 has a cylindrical shape with a central axis that extends orthogonally through the opening 30.

A plurality of mounting straps 32 is coupled to the flexible sheet 16. Each mounting strap 32 of the plurality of mounting straps 32 is mounted to the flexible sheet 16 on an associated mounting edge 22 of the pair of mounting edges 22. Each mounting strap 32 of the plurality of mounting straps 32 is sized to surround a corresponding one of the pair of rotor blades 72. Each mounting strap 32 comprises a pair of segments 34 and a connector 38. Each segment 34 of each mounting strap 32 is coupled to and extends away from the flexible sheet 16.

The connector 38 of each mounting strap 32 is positioned on free ends 36 of the segments 34 to selectively attach the free ends 36 together, forming a closed loop to surround a corresponding rotor blade 72 of the helicopter 70. The connector 38 of each mounting strap 32 comprises a parachute buckle but may comprise a hook-and-loop fastener, a snap fastener, or any other suitable fastening means. In other embodiments, the segments 34 of each mounting strap 32 may be tied together to mount the canopy apparatus 10 to the rotor blades 72. Each mounting strap 32 is adjustable in length such that the mounting strap 32 is cinchable around the associated rotor blade 72. At least one of the segments 34 of each mounting strap 32 is slidable through the connector 38 to facilitate this cinching action.

The canopy apparatus 10 may be positioned in a stored configuration 40 in which the flexible sheet 16, the rotor blade pockets 12, and the mounting straps 32 are positioned in the rotor head pocket 28. A carrying strap 42 is attached to the rotor head pocket 28 to facilitate carrying the canopy apparatus 10 in the stored configuration 40. In some embodiments the rotor head pocket 28 may be removably attached to the flexible sheet 16 via one or more fasteners. The fasteners may comprise additional parachute buckles or other suitable fastening means. The fasteners may also comprise connecting straps which are adjustable in length. The flexible sheet 16, the mounting straps 32, and one of the rotor blade pockets 12 also may be packed into another one of the rotor blade pockets 12, resulting in a bundle that is storable in the rotor head pocket 28.

In use, the canopy apparatus 10 is mounted to the helicopter 70 to provide shade to an area adjacent to the helicopter 70. The rotor blade pockets 12 are placed around the free ends 74 of corresponding rotor blades 72 of the helicopter 70 which lie radially adjacent to each other. The rotor head pocket 28 receives the rotor head 76 of the helicopter 70 therein through the opening 30 to mount the rotor head pocket 28 to the rotor head 76. When the canopy apparatus 10 is mounted to the helicopter 70 each mounting edge 22 of the flexible sheet 16 lies adjacent and parallel to a corresponding rotor blade 72 of the pair of rotor blades 72. Individuals may find refuge from weather elements such as radiant heat from the sun or precipitation by standing below the canopy apparatus 10. The shade may help mechanics or other workers perform work on the helicopter 70 while being protected from these weather elements.

The cylindrical shape of the rotor head pocket 28 facilitates movement of the canopy apparatus 10 to a desired position by rotating the rotor blades 72 with respect to a body 78 of the helicopter 70. Other shapes for the rotor head pocket 28 are contemplated which are suitable for facilitating this movement.

The canopy apparatus 10 may be placed in tension between the rotor head 76 and the free ends 74 of the corresponding rotor blades 72 to further secure the canopy apparatus 10 to the helicopter 70. In embodiments where fasteners having connecting straps of adjustable length couple the flexible sheet 16 to the rotor head pocket 28, the connecting straps may be cinched as desired to adjust the tension in the canopy apparatus 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A canopy apparatus configured to mount to a helicopter, the apparatus comprising:
   a pair of rotor blade pockets, each rotor blade pocket being shaped and configured to receive therein a free end of a corresponding rotor blade of a pair of rotor blades of the helicopter which lie radially adjacent to each other;
   a flexible sheet being coupled to and extending between the pair of rotor blade pockets, the flexible sheet having a top side and a bottom side, each rotor blade pocket being mounted to a corresponding mounting edge of a pair of mounting edges of the flexible sheet, each mounting edge of the flexible sheet extending from the corresponding rotor blade pocket toward a vertex; and
   a rotor head pocket coupled to the flexible sheet at the vertex, the rotor head pocket having an opening extending therein which faces downwardly with respect to the flexible sheet during normal use, the rotor head pocket being shaped and configured to receive a rotor head of the helicopter therein.

2. The apparatus of claim 1, wherein each mounting edge of the pair of mounting edges being configured to lie adjacent and parallel to a corresponding rotor blade of the pair of rotor blades of the helicopter.

3. The apparatus of claim 1, wherein the flexible sheet has a triangular shape.

4. The apparatus of claim 1, wherein the rotor head pocket is shaped and configured to permit the rotor blades of the helicopter to rotate with respect to a body of the helicopter.

5. The apparatus of claim 4, wherein the rotor head pocket has a cylindrical shape with a central axis that extends orthogonally through the opening.

6. The apparatus of claim 1, further comprising a plurality of mounting straps coupled to the flexible sheet, each mounting strap of the plurality of mounting straps being mounted to the flexible sheet on an associated mounting edge of the pair of mounting edges, each mounting strap of the plurality of mounting straps being sized and configured to surround a corresponding one of the pair of rotor blades.

7. The apparatus of claim 6, wherein each mounting strap comprises a pair of segments and a connector for attaching the pair of segments to each other.

8. The apparatus of claim 7, wherein the connector of each mounting strap comprises a parachute buckle.

9. The apparatus of claim 6, wherein each mounting strap is adjustable in length such that the mounting strap is cinchable.

10. The apparatus of claim 6, wherein the rotor head pocket is sized to receive the rotor blade pockets, the flexible sheet, and the mounting straps therein through the opening to position the canopy apparatus in a stored configuration.

11. The apparatus of claim 1, wherein the rotor head pocket is sized to receive the rotor blade pockets and the flexible sheet therein through the opening to position the canopy apparatus in a stored configuration.

12. A canopy apparatus configured to mount to a helicopter, the apparatus comprising:
 a pair of rotor blade pockets, each rotor blade pocket being shaped and configured to receive therein a free end of a corresponding rotor blade of a pair of rotor blades of the helicopter which lie radially adjacent to each other;
 a flexible sheet being coupled to and extending between the pair of rotor blade pockets, the flexible sheet having a top side and a bottom side, each rotor blade pocket being mounted to a corresponding mounting edge of a pair of mounting edges of the flexible sheet, each mounting edge of the flexible sheet extending from the corresponding rotor blade pocket toward a vertex, each mounting edge of the pair of mounting edges being configured to lie adjacent and parallel to a corresponding rotor blade of the pair of rotor blades of the helicopter, the flexible sheet having a triangular shape;
 a rotor head pocket coupled to the flexible sheet at the vertex, the rotor head pocket having an opening extending therein which faces downwardly with respect to the flexible sheet during normal use, the rotor head pocket being shaped and configured to receive a rotor head of the helicopter therein, the rotor head pocket having a cylindrical shape with a central axis that extends orthogonally through the opening; and
 a plurality of mounting straps coupled to the flexible sheet, each mounting strap of the plurality of mounting straps being mounted to the flexible sheet on an associated mounting edge of the pair of mounting edges, each mounting strap of the plurality of mounting straps being sized and configured to surround a corresponding one of the pair of rotor blades, each mounting strap comprising a pair of segments and a connector for attaching the pair of segments to each other, each mounting strap being adjustable in length such that the mounting strap is cinchable, the connector of each mounting strap comprising a parachute buckle;
 wherein the rotor head pocket is sized to receive the rotor blade pockets, the flexible sheet, and the mounting straps therein through the opening to position the canopy apparatus in a stored configuration.

* * * * *